US012087202B2

(12) United States Patent
Park et al.

(10) Patent No.: US 12,087,202 B2
(45) Date of Patent: Sep. 10, 2024

(54) VOLTAGE DROP COMPENSATION SYSTEM OF DISPLAY PANEL, AND DISPLAY DRIVING DEVICE FOR COMPENSATING FOR VOLTAGE DROP OF DISPLAY PANEL

(71) Applicant: LX Semicon Co., Ltd., Daejeon (KR)

(72) Inventors: Jun Young Park, Daejeon (KR); Min Ji Lee, Daejeon (KR); Gang Won Lee, Daejeon (KR); Young Kyun Kim, Daejeon (KR); Ju Hyoung Lim, Daejeon (KR); Ji Won Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/237,252

(22) Filed: Aug. 23, 2023

(65) Prior Publication Data

US 2023/0395011 A1 Dec. 7, 2023

Related U.S. Application Data

(63) Continuation of application No. 17/851,472, filed on Jun. 28, 2022, now Pat. No. 11,776,451.

(30) Foreign Application Priority Data

Jun. 28, 2021 (KR) ........................ 10-2021-0083737
Jun. 24, 2022 (KR) ........................ 10-2022-0077741

(51) Int. Cl.
*G09G 3/20* (2006.01)

(52) U.S. Cl.
CPC ... *G09G 3/2007* (2013.01); *G09G 2320/0233* (2013.01); *G09G 2320/0626* (2013.01); *G09G 2360/145* (2013.01); *G09G 2360/16* (2013.01)

(58) Field of Classification Search
CPC ......... G09G 3/2007; G09G 2320/0233; G09G 2320/0626; G09G 2360/145; G09G 2360/16
See application file for complete search history.

(56) References Cited

U.S. PATENT DOCUMENTS

| | | | |
|---|---|---|---|
| 9,734,764 | B2 | 8/2017 | Park et al. |
| 10,043,443 | B2 | 8/2018 | Zhang |
| 2014/0118409 | A1 | 5/2014 | Jun et al. |
| 2015/0356947 | A1 | 12/2015 | Eom et al. |
| 2016/0247445 | A1 | 8/2016 | Zhang |
| 2018/0190214 | A1 | 7/2018 | Kim et al. |
| 2020/0135112 | A1 | 4/2020 | Zhang |
| 2020/0211429 | A1 | 7/2020 | Kim et al. |
| 2020/0279519 | A1 | 9/2020 | Orio et al. |
| 2020/0335054 | A1 | 10/2020 | Nagashima |
| 2021/0335296 | A1 | 10/2021 | Wang |

FOREIGN PATENT DOCUMENTS

| | | | |
|---|---|---|---|
| KR | 10-2028504 | A | 10/2019 |
| KR | 10-2231363 | A | 3/2021 |

*Primary Examiner* — Michael Pervan
(74) *Attorney, Agent, or Firm* — POLSINELLI PC

(57) ABSTRACT

A voltage drop compensation system and a display driving device for compensating for a voltage drop of a display panel. The voltage drop compensation system generates a voltage drop compensation value for each of a plurality of regions into which a test image of a panel is divided, and the display driving device compensates for a voltage drop for each region of image data using the voltage drop compensation value.

21 Claims, 11 Drawing Sheets

VOLTAGE DROP COMPENSATION SYSTEM OF DISPLAY PANEL, AND DISPLAY DRIVING DEVICE FOR COMPENSATING FOR VOLTAGE DROP OF DISPLAY PANEL

CROSS-REFERENCE TO RELATED APPLICATIONS

This application is a continuation of U.S. patent application Ser. No. 17/851,472, filed on Jun. 28, 2022, which claims the priority of Korean Patent Application No. 10-2021-0083737, filed on Jun. 28, 2021, and Korean Patent Application No. 10-2022-0077741 filed on Jun. 24, 2022, which are hereby incorporated by reference in their entirety

BACKGROUND

Field of the Disclosure

The present disclosure relates to a technology of compensating for a voltage drop of a display panel, and more particularly, to a voltage drop compensation system and a display driving device for compensating for a voltage drop of a display panel.

Description of the Background

In general, in the panel of an active matrix flat display device, a plurality of pixels are arranged in a matrix form, and each pixel includes a thin film transistor (TFT) for switching an applied voltage and an electro-optical conversion element for converting an electrical signal into light.

The display device displays an image by controlling the luminance of each pixel expressed through the electro-optical conversion element according to given luminance information.

In the panel of the display device, a plurality of voltage lines which transfer a driving voltage and pixels which are driven by the driving voltage are formed. The driving voltage may be nonuniformly transferred to the pixels on the panel according to the positions of the pixels by the influence of the resistances, RC delays and so forth of the voltage lines.

That is to say, the voltage drop (IR drop) of the driving voltage may occur differently according to the positions of the pixels. The voltage drop may increase as a pixel is far away from a panel driver which provides the driving voltage, and accordingly, power supply to the pixel may become unstable.

Therefore, in the display device, the luminance of the pixels may become nonuniform due to differences in voltage drop according to the positions of the pixels on the panel.

SUMMARY

Accordingly, the present disclosure is directed to a voltage drop compensation system and a display driving device for compensating for a voltage drop of a display panel that substantially obviate one or more of problems due to limitations and disadvantages described above.

More specifically, the present disclosure is to provide a voltage drop compensation system and a display driving device for compensating for a voltage drop that may differ according to a position of pixels on a panel, thereby improving nonuniformity in luminance according to a position on a screen.

Also, the present disclosure is to provide a voltage drop compensation system and a display driving device for compensating for Mura and a voltage drop occurring in a panel, thereby improving the luminance of pixels.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a voltage drop compensation system of a display panel may include: an image receiver configured to divide a test image of a panel into a plurality of regions; a luminance value generator configured to generate a detected luminance value of each of the plurality of regions; and a voltage drop compensation value generator configured to generate a voltage drop compensation value of a region in which a voltage drop has occurred among the plurality of regions, by comparing the detected luminance value and a preset target luminance value, wherein the target luminance value is a luminance value of a region which is selected as a target region among the plurality of regions, and wherein the voltage drop compensation value is a difference value between the detected luminance value and the target luminance value.

In an aspect of the present disclosure, a display driving device may include: a voltage drop compensation value storage configured to store a voltage drop compensation value for each of a plurality of regions into which a panel is divided; and a voltage drop compensator configured to receive image data and the voltage drop compensation value, and generate voltage drop compensation data by applying the voltage drop compensation value to the image data corresponding to each of the plurality of regions.

In another aspect of the present disclosure, a method of compensating for a voltage drop in a display apparatus, the method includes receiving/restoring an image data and outputting the restored image data; generating a voltage drop compensation data by applying a voltage drop compensation value to the image data corresponding to a plurality of blocks, each block comprising a plurality of pixels; generating a Mura compensation value for each block with the voltage drop compensated image data; and outputting a Mura compensated image data in accordance with the Mura compensation data to the plurality of blocks to maintain uniform luminance in the plurality of blocks.

According to various aspects of the present disclosure, it is possible to compensate for a voltage drop that may occur differently according to a position of a pixel of a panel, thereby securing uniformity in luminance according to a position on a screen.

Also, according to various aspects of the present disclosure, by compensating for Mura or a voltage drop, it is possible to improve the luminance of pixels, and a panel may display a screen with uniform luminance.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
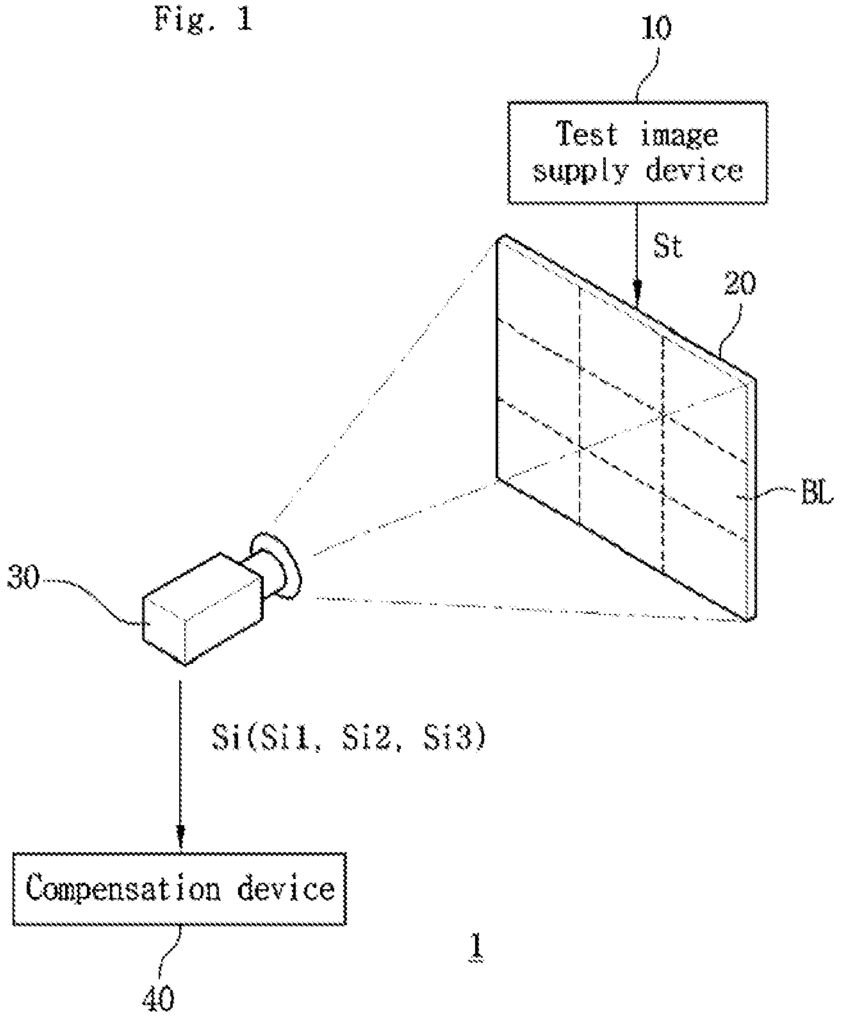
FIG. 1 is a block diagram illustrating a voltage drop compensation system of a display panel in accordance with an aspect of the present disclosure.

A voltage drop compensation system according to the present disclosure may be implemented as illustrated in FIG. 1. An aspect of the voltage drop compensation system according to the present disclosure will be described below with reference to FIG. 1.

A voltage drop compensation system 1 is to generate a voltage drop compensation value for compensating for a voltage drop (or IR drop) that occurs differently at the respective positions of pixels on a panel 20.

To this end, the voltage drop compensation system 1 may be implemented to include a test image supply device 10, a photographing device 30 and a compensation device 40.

The voltage drop compensation system 1 configured as described above may display a test image on the panel 20 by a test image signal St, and may photograph the test image displayed on the panel 20.

An image displayed on the panel 20 by the test image signal St may be defined as a test image, and an image obtained by photographing the test image may also be defined as a test image.

The voltage drop compensation system 1 may divide the photographed test image, detect the luminance of each of a plurality of blocks into which the test image is divided, and generate a detected luminance value for each block.

The voltage drop compensation system 1 generates a comparison result by comparing the detected luminance value and a preset target luminance value for each block.

The voltage drop compensation system 1 may determine whether or not a voltage drop has occurred and the degree of the voltage drop for each block by using the comparison result.

The voltage drop compensation system 1 may generate a voltage drop compensation value for a block in which a voltage drop has occurred, by using a comparison value generated as the comparison result. The voltage drop compensation value is a value for compensating a driving voltage to be provided to the pixels of a block in which a voltage drop has occurred in the panel 20, and may be understood as being used to compensate image data in a panel driver 100 (shown in FIG. 3) which provides a driving voltage to the panel 20.

A detailed method in which the voltage drop compensation system 1 generates a voltage drop compensation value for compensating for a voltage drop will be described later.

For the sake of convenience in explanation, it is illustrated that a test image obtained by photographing the test image of the panel 20 is divided into a plurality of quadrangular blocks. However, the aspect is not limited thereto, and each block may be a predetermined region including a circle, an ellipse and the like. Hereinafter, in the aspect, a block means a region.

In the aspect, a voltage drop means a phenomenon in which the driving voltage provided to the pixels of the panel 20 from the panel driver 100 becomes unstable by the influence of the resistances, RC delays and so forth of voltage lines, and may occur differently depending on the distances between the pixels of the panel 20 and the panel driver 100.

A more detailed configuration and operation of the voltage drop compensation system 1 will be described below.

The test image supply device 10 may supply the test image signal St for displaying a test image to the panel 20.

A voltage drop may occur differently depending on a display brightness value (hereinafter referred to as "DBV"), a grayscale value and the characteristics of the panel 20.

The test image supply device 10 may store in advance test data for each DBV and each grayscale value preset for testing, and may provide the test image signal St corresponding to selected test data to the panel 20 to display a test image. The test image supply device 10 may sequentially provide the test image signal St corresponding to test data for each DBV and each grayscale value.

A test image for measuring a luminance may be displayed on the panel 20 in response to the test image signal St.

The test image signal St may be provided for a plurality of DBVs, for example, 200 nit, 420 nit and 800 nit, by assuming that there is no voltage drop in the panel 20.

Also, the test image signal St may be provided for a plurality of grayscales, for example, 32 grayscale, 64 grayscale and 128 grayscale, by assuming that there is no voltage drop in the panel 20.

In other words, the test image signal St may be provided to correspond to test data corresponding to a specific DBV and a specific grayscale value.

The panel 20 includes a plurality of pixels which are arranged in a matrix form, and may display a test image according to the test image signal St.

In more detail, the panel 20 may display a test image corresponding to a specific grayscale and a specific DBV according to the test image signal St. For example, the panel 20 may display a test image for each DBV on the basis of a first grayscale, a second grayscale or a third grayscale according to the test image signal St. The first grayscale, the second grayscale and the third grayscale may be selected by a manufacturer within a predetermined grayscale range, for example, among 0 to 255 grayscales, and may be exemplified as 32 grayscale, 64 grayscale and 128 grayscale. The test image signal St may be provided to correspond to the grayscale value of a selected grayscale.

As described above, a voltage drop may occur differently even in the same pixel depending on a DBV, an input grayscale value and the unique characteristics of the panel 20. Furthermore, a voltage drop may occur differently according to the distance between each of the pixels and the panel driver 100 (shown in FIG. 3) in a direction away from the panel driver (a direction indicated by the arrow of FIG. 3). The panel 20 may be an LCD panel or an OLED panel used in a mobile device, but the aspect is not limited thereto.

In addition, the panel 20 may display an image to have Mura in which luminance is displayed nonuniformly according to the characteristics of pixels. Mura means a phenomenon in which an image is displayed to have nonuniform luminance in a certain region of the panel 20 due to a problem such as defects of pixels. In this case, the panel driver 100 which provides a driving voltage to the panel 20 needs to compensate image data to compensate for not only a voltage drop but also the luminance nonuniformity of the panel 20 due to Mura. A detailed method for compensating for a voltage drop and Mura will be described later.

The photographing device 30 may photograph a part or the entirety of the panel 20 which displays a test image, and may generate an image signal Si for a test image obtained by photographing the test image of the panel 20. The photographing device 30 may be configured using a camera for measuring the luminance of a test image. For example, the photographing device 30 may be configured to include a luminance meter capable of measuring the luminance of a display device such as an LCD, a PDP, an OLED and a rear projector, but the aspect is not limited thereto.

For instance, the photographing device 30 may sequentially photograph test images corresponding to a first grayscale, a second grayscale and a third grayscale, respectively, of the same DBV, which are sequentially displayed on the panel 20, and may sequentially generate and provide a first image signal Si1, a second image signal Si2 and a third image signal Si3 corresponding thereto.

Moreover, the photographing device 30 may sequentially photograph test images corresponding to a first DBV, a second DBV and a third DBV, respectively, of the same grayscale, which are sequentially displayed on the panel 20, and may sequentially generate and provide a first image signal Si1, a second image signal Si2 and a third image signal Si3 corresponding thereto.

The compensation device 40 may receive the image signal Si obtained by photographing the panel 20, and may divide a test image corresponding to the image signal Si into a plurality of blocks BL.

The compensation device 40 may generate a detected luminance value by detecting a luminance value for each block BL. The detected luminance value of the block BL may be generated as a value representing the luminance values of pixels included in the block BL. For example, the detected luminance value may be set as the average value of the luminance values of the pixels included in the block BL.

The compensation device 40 may store a preset target luminance value.

The compensation device 40 may generate a comparison value as a comparison result of comparing the detected luminance value and the target luminance value for each block, and, by using the comparison value, may detect blocks in each of which a voltage drop has occurred among the plurality of blocks BL.

The compensation device 40 may calculate a value that changes the detected luminance value to compensate for the voltage drop of a block in which the voltage drop has occurred, that is, a voltage drop compensation value. The compensation device 40 may store the voltage drop compensation value generated by the calculation described above.

Figure 2:
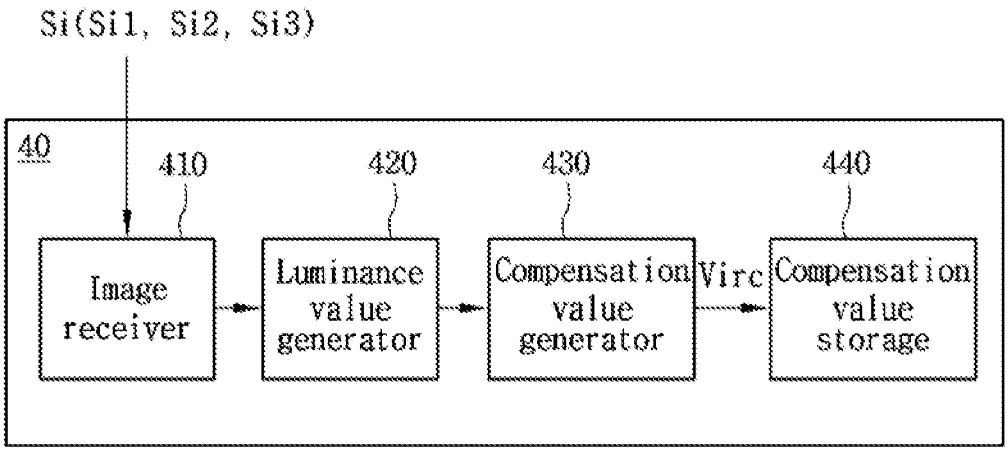
FIG. 2 is a block diagram of a compensation device of FIG. 1.

Hereinafter, the configuration and operation of the compensation device 40 of FIG. 1 will be described in detail with reference to FIG. 2.

The compensation device 40 may include an image receiver 410, a luminance value generator 420, a compensation value generator 430 and a compensation value storage 440.

The image receiver 410 may receive the image signal Si corresponding to a test image obtained by photographing a test image of the panel 20 by the photographing device 30, and may divide the test image of the panel 20 into the plurality of blocks BL. The image receiver 410 may provide the image signal Si and position information for each block BL.

The luminance value generator 420 may receive the image signal Si and the position information for each block BL from the image receiver 410, and may generate a detected luminance value for each block BL by using the image signal Si for each block BL. Namely, the luminance value generator 420 may generate a detected luminance value for each block BL in response to the image signal Si for each grayscale value of a preset DBV.

For instance, the luminance value generator 420 may generate a detected luminance value for each block BL by using the first image signal Si1 for each block BL corresponding to the first grayscale, may generate a detected luminance value for each block BL by using the second image signal Si2 for each block BL corresponding to the second grayscale, and may generate a detected luminance value for each block BL by using the third image signal Si3 for each block BL corresponding to the third grayscale.

The luminance value generator 420 may provide a detected luminance value and position information for each block to the compensation value generator 430.

The compensation value generator 430 may receive the detected luminance value and position information for each block from the luminance value generator 420, and may generate a voltage drop compensation value Virc for each block BL. A detailed method in which the compensation value generator 430 generates the voltage drop compensation value Virc will be described later.

The compensation value generator 430 may provide the voltage drop compensation value Virc generated as described above and position information for each block BL to the compensation value storage 440.

The compensation value storage 440 may store the voltage drop compensation value Virc by the unit of block in the form of a lookup table by using the position information. The compensation value storage 440 may store the voltage drop compensation value Virc to be distinguished in terms of each DBV and each grayscale value for the same block.

Figure 3:
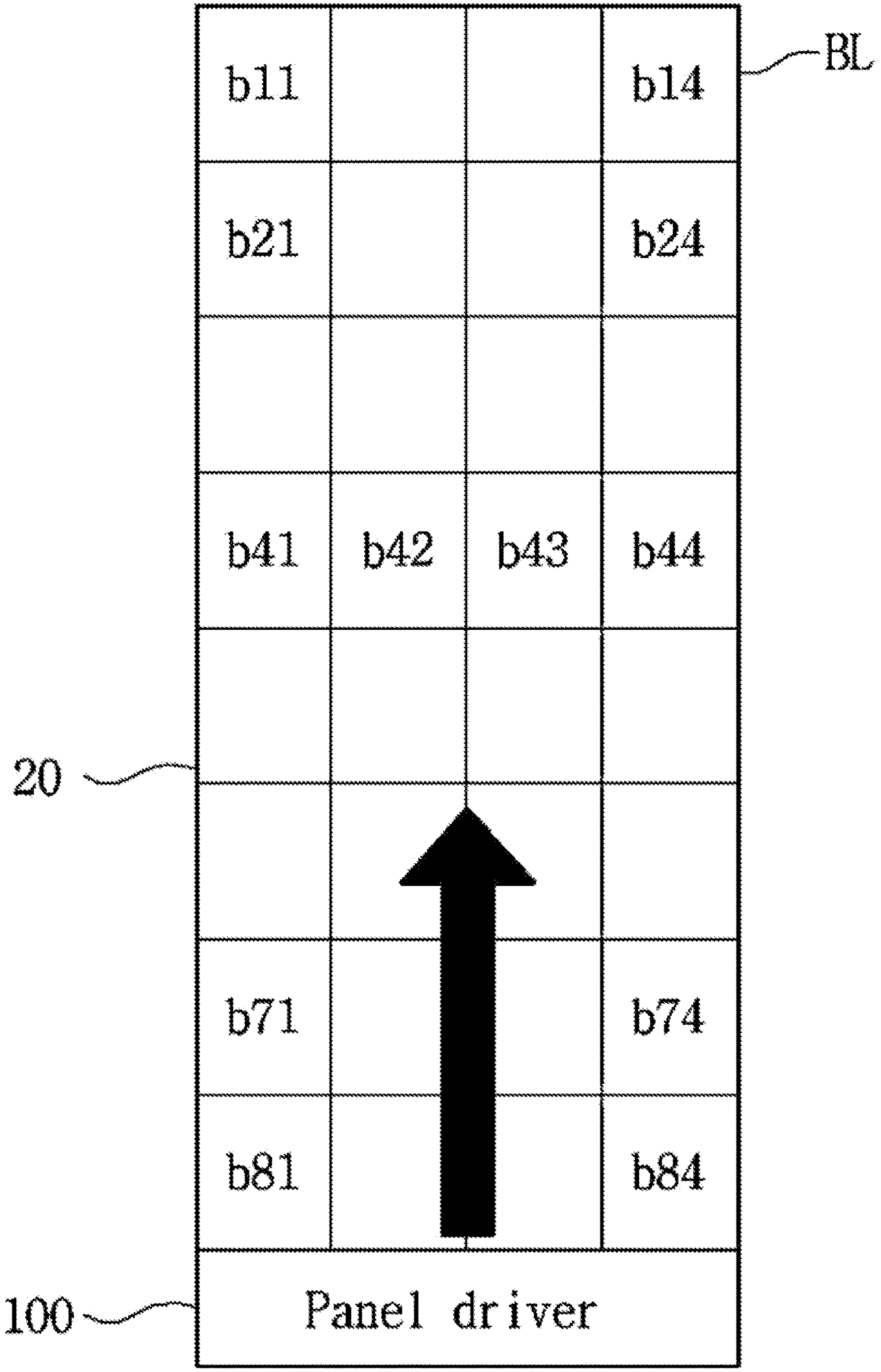
FIG. 3 is a diagram illustrating that the image of a panel is divided.

Hereinafter, a detailed method in which the image receiver 410 divides a test image obtained by photographing a test image of the panel 20 into the plurality of blocks BL will be described with reference to FIG. 3.

The image receiver 410 may divide a test image obtained by photographing a test image of the panel 20 into the plurality of blocks BL by using the image signal Si corresponding to a specific DBV and a specific grayscale, and may generate position information for each divided block BL.

For example, the image receiver 410 may receive the image signal Si for a test image from the photographing device 30, may divide the test image into 4×8 blocks BL, and may generate the position information of the respective 4×8 blocks BL. In FIG. 3, it may be seen that the divided blocks BL are denoted by b11 to b84. It may be understood that the reference symbol BL indicating a block in FIG. 3 represents each of the blocks included in the test image of the panel 20.

It is described in the aspect for the sake of convenience in explanation that the image receiver 410 divides a test image of the panel 20 into 4×8 blocks BL, but the aspect is not limited thereto. For example, when the size of the panel 20 is 1080×2400, theoretically, a test image may be divided into 1080×2400 blocks, and as another example, a test image may be divided into 270×600 blocks.

Hereinafter, a detailed method in which the compensation value generator 430 generates the voltage drop compensation value Virc will be described with reference to FIGS. 4 to 6.

The compensation value generator 430 may generate the voltage drop compensation value Virc for each block BL by using the target luminance value. The compensation value generator 430 may select an arbitrary block which is positioned at or is closest to the center of the panel 20 among the plurality of blocks BL, as a target block, and may set the detected luminance value of the target block as a target luminance value. In the case of FIG. 4, the block b42 among the plurality of blocks BL may be selected as the target block, and the detected luminance value of the block b42 may be set as the target luminance value.

The compensation value generator 430 may receive the detected luminance values and position information of the plurality of blocks BL from the luminance value generator 420. The compensation value generator 430 may compare the target luminance value and the detected luminance value for each block BL, and when there is a difference between the target luminance value and the detected luminance value, may determine that a voltage drop has occurred in the corresponding block BL.

Figure 4:
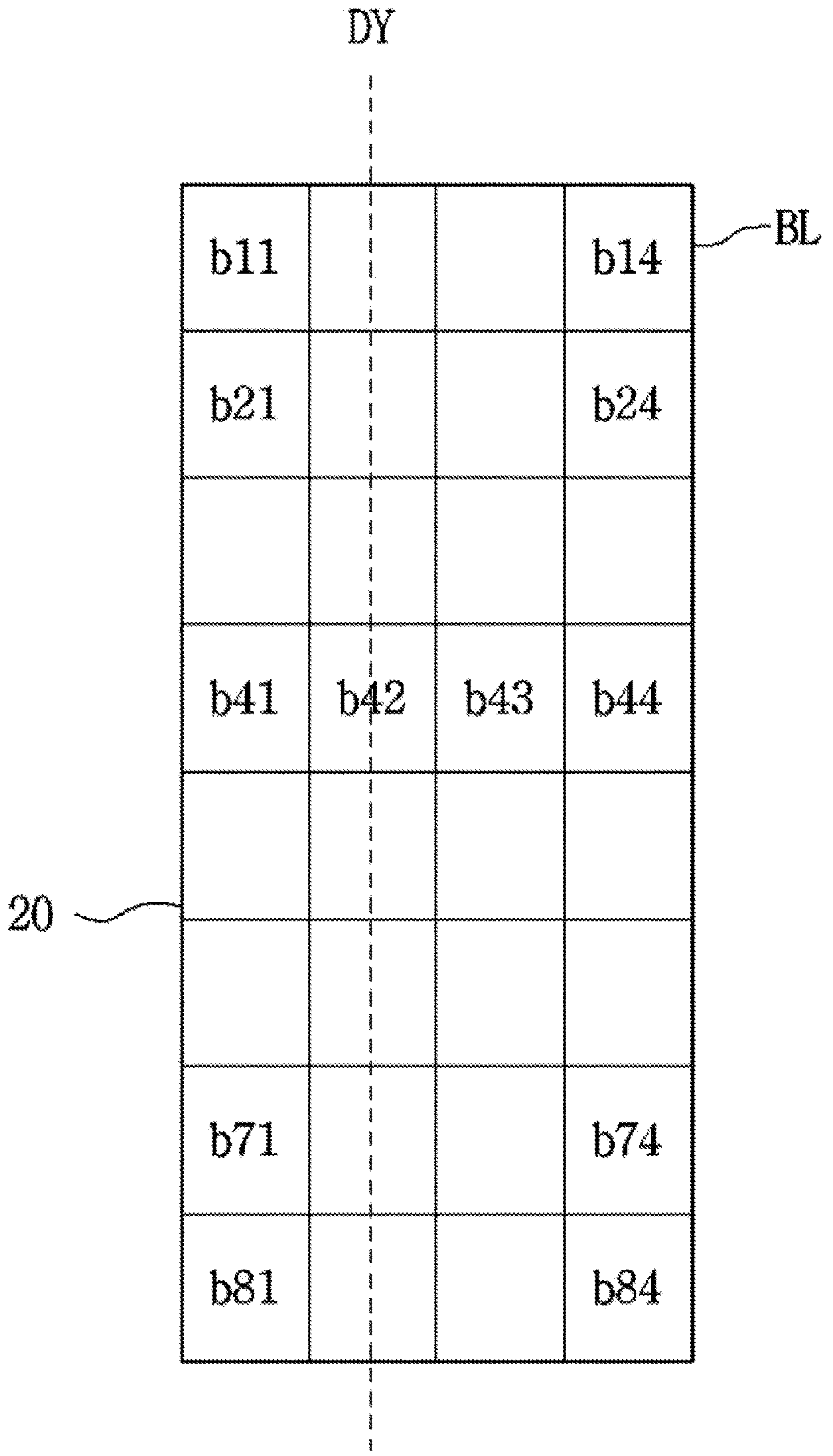
FIG. 4 is a diagram for explaining the setting of a target luminance value and a detected luminance value.

In FIG. 4, it may be understood that the reference symbol DY denotes a y-axis line including the block b42 selected as the target block. It may be understood that the y-axis line DY indicates a direction in which a driving voltage is transferred through the panel 20 from the panel driver 100, and a voltage drop may occur differently depending on the position of a block BL on the y-axis line DY.

Figure 5:
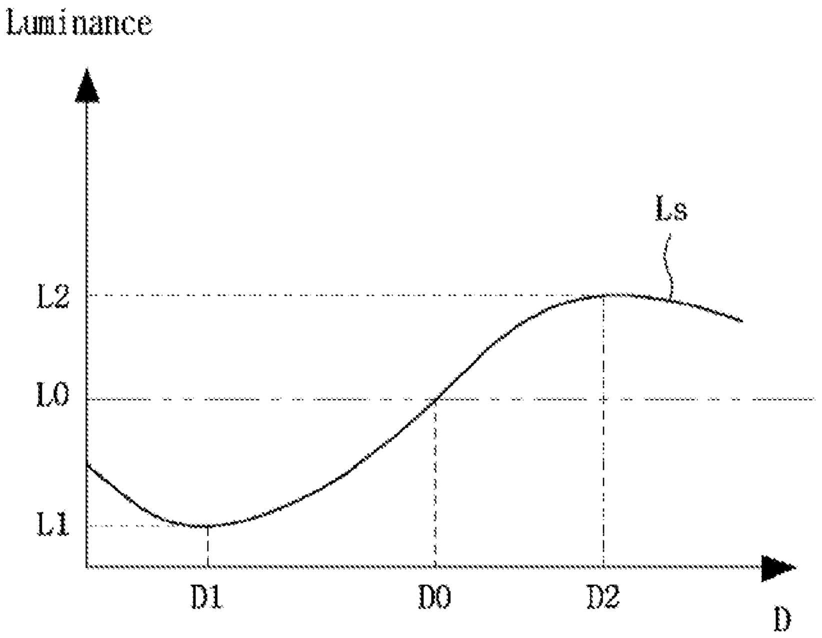
FIG. 5 is a graph showing changes in detected luminance value on a y-axis line DY of FIG. 4.
Figure 6:
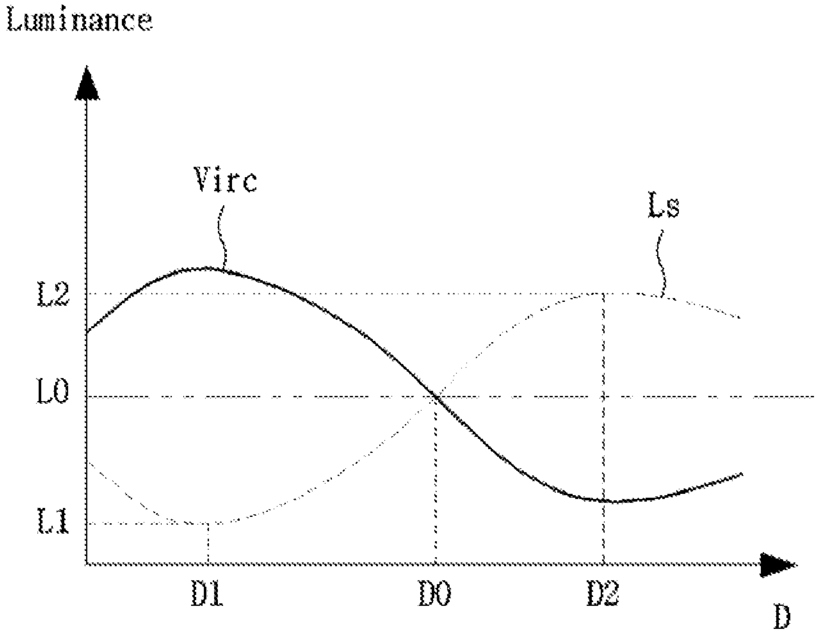
FIG. 6 is a graph showing a voltage drop compensation value corresponding to a detected luminance value of FIG. 5.

For example, voltage drops on the y-axis line DY may occur at different levels depending on the positions of the blocks BL as shown in FIG. 5.

FIG. 5 is a graph showing the relationship between luminance and distance D, and shows detected luminance values which vary according to the positions of the blocks BL on the y-axis line DY of FIG. 4.

In FIG. 5, L0, L1 and L2 mean detected luminance values, and D0, D1 and D2 mean distances by which blocks BL are separated from the panel driver 100. For example, it may be understood that the block b42 selected as the target block has a detected luminance value of L0 at a position of DO. L0 may be understood as the target luminance value.

In FIG. 5, Ls may represent a change curve of detected luminance value on the y-axis line DY of FIG. 4, and L1 may be understood as a detected luminance value of an arbitrary block at a position of D1 farther from the panel driver 100 than the block b42 on the y-axis line DY and may correspond to the lowest luminance value of the curve Ls. L2 may be understood as a detected luminance value of an arbitrary block at a position of D2 closer to the panel driver 100 than the block b42 on the y-axis line DY and may correspond to the highest luminance value of the curve Ls.

Accordingly, the compensation value generator 430 may generate voltage drop compensation values Virc for the blocks BL having different detected luminance values according to the positions thereof as on the y-axis line DY of FIG. 5, on the basis of the target luminance value corresponding to the detected luminance value of the block b42.

The voltage drop compensation values Virc of the blocks BL may be understood as difference values between the target luminance value and the detected luminance values of the blocks BL. In the case of FIG. 5, the voltage drop compensation values Virc may be generated as shown in FIG. 6.

That is to say, to compensate the detected luminance values of the blocks BL to the target luminance value L0, the compensation value generator 430 may generate the voltage drop compensation value Virc for each block BL by comparing the target luminance values L0 and each of the detected luminance values of the blocks BL. As a comparison result, the compensation value generator 430 may calculate, for each block BL, a difference value between the target luminance value L0 and the detected luminance value of each of the blocks BL, and may generate the difference value as the voltage drop compensation value Virc as shown in FIG. 6.

It has been described with reference to FIGS. 4 to 6 that the aspect of the present disclosure calculates the voltage drop compensation value Virc on the y-axis line DY on which the block b42 is positioned. However, even for the other blocks BL which are not positioned on the y-axis line DY, the compensation value generator 430 may generate difference values between the target luminance value L0 corresponding to the detected luminance value of the block b42 and the detected luminance values of the corresponding blocks BL as voltage drop compensation values Virc, by the above-described method.

As described above, the voltage drop compensation values Virc generated by the compensation value generator 430 may be stored in the compensation value storage 440 together with the position information.

The compensation value storage 440 may convert the voltage drop compensation values Virc into digital data and store the digital data in the form of a lookup table such that the respective voltage drop compensation values Virc match the position information, DBVs and grayscale values of the corresponding blocks BL.

The voltage drop compensation values Virc stored in the compensation value storage 440 may be stored in the panel driver 100 for driving the panel 20, and may be used to compensate for the voltage drop of image data.

Hereinafter, the panel driver 100 in accordance with an aspect of the present disclosure will be described with reference to FIG. 7. The panel driver 100 of FIG. 7 may be understood as an aspect of a display driving device for voltage drop compensation according to the present disclosure.

Figure 7:
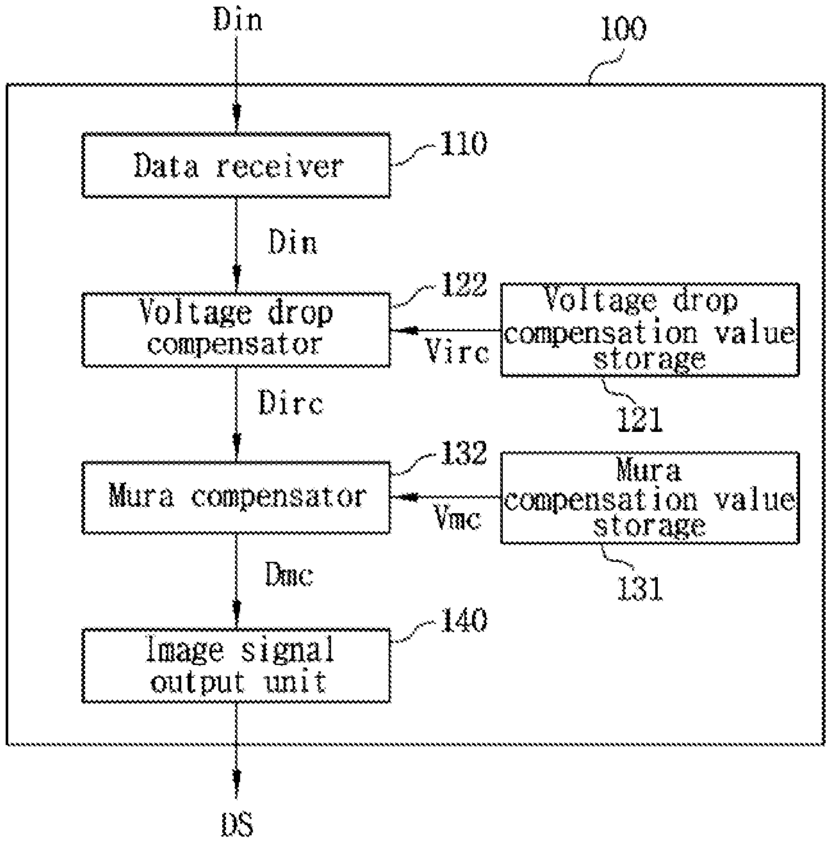
FIG. 7 is a block diagram showing a display driving device in accordance with an aspect of the present disclosure.

Referring to FIG. 7, the panel driver 100 may apply the voltage drop compensation value Virc to image data Din inputted from the outside by the unit of block BL and then apply a Mura compensation value Vmc for compensating for Mura occurring in the panel 20, and thereby, may generate an image signal DS in which a voltage drop and Mura are compensated for. The image signal DS may be understood as a driving voltage to be provided to the panel 20.

The panel driver 100 includes a data receiver 110, a voltage drop compensation value storage 121, a voltage drop compensator 122, a Mura compensation value storage 131, a Mura compensator 132 and an image signal output unit 140.

The data receiver 110 may receive the image data Din inputted from the outside, may restore the image data Din, and may output the restored image data Din. The image data Din inputted from the outside to the data receiver 110 and the image data Din provided from the data receiver 110 to the voltage drop compensator 122 may have different formats. Accordingly, the data receiver 110 may perform a restoration operation to transfer the image data Din to the voltage drop compensator 122. Since the restoration operation may be variously performed by a manufacturer, detailed description thereof will be omitted.

The voltage drop compensation value storage 121 may store the voltage drop compensation value Virc. The voltage drop compensation value storage 121 may store the voltage drop compensation value Virc in the form of a lookup table (LUT) by the unit of block BL. The voltage drop compensation value Virc of the voltage drop compensation value storage 121 may be understood as being obtained by storing the voltage drop compensation value Virc of the compensation value storage 440 of the compensation device 40. Since the voltage drop compensation value Virc in the voltage drop compensation value storage 121 may be stored in the same manner as in the compensation value storage 440 of the compensation device 40, description thereof will be omitted.

The voltage drop compensator 122 receives the image data Din from the data receiver 110, and receives the voltage drop compensation value Virc from the voltage drop compensation value storage 121.

The voltage drop compensator 122 may generate voltage drop compensation data Dirc by applying the voltage drop compensation value Virc to the image data Din by the unit of block BL. The voltage drop compensation data Dirc is obtained by compensating luminance by applying the voltage drop compensation value Virc to the image data Din for each block BL. In other words, to compensate for a difference in luminance value due to a voltage drop in each block, the voltage drop compensation value Virc for each block may be applied to the image data Din for each block, and the voltage drop compensation data Dirc may be generated as a result of the application. For example, by using the voltage drop compensation value Virc, that is, a compensation value, in adjusting the gain of the image data Din, the voltage drop compensator 122 may generate the voltage drop compensation data Dirc.

The voltage drop compensation value Virc may be selected to correspond to a DBV applied to the image data Din and the grayscale of the image data Din.

A more detailed method in which the voltage drop compensator 122 according to the aspect applies the voltage drop compensation data Dirc will be described later.

The Mura compensation value storage 131 may store the Mura compensation value Vmc for compensating for Mura occurred in the panel 20. The Mura compensation value Vmc may be stored to have position information for each block or for each pixel.

The Mura compensator 132 is configured to receive the voltage drop compensation data Dirc of the voltage drop compensator 122 and the Mura compensation value Vmc of the Mura compensation value storage 131. A detailed method of applying the Mura compensation value Vmc to the Mura compensator 132 will be described later.

The Mura compensator 132 may compensate for Mura by the unit of block BL using the Mura compensation value Vmc.

To this end, the Mura compensator 132 may generate Mura compensation data Dmc by applying the Mura compensation value Vmc for each block to the voltage drop compensation data Dirc. In more detail, the Mura compensator 132 may be configured to convert the voltage drop compensation value Virc into the Mura compensation value Vmc by a preset Mura compensation equation. Therefore, the Mura compensator 132 may apply the Mura compensation value Vmc to a coefficient of the Mura compensation equation, and may generate the Mura compensation data Dmc by calculating the voltage drop compensation data Dirc by the Mura compensation equation. The Mura compensation equation may be composed of a linear equation, a quadratic equation or a multi-order equation by a manufacturer. The Mura compensation data Dmc may be understood as image data obtained by compensating for the luminance of the voltage drop compensation data Dirc for Mura compensation.

The image signal output unit 140 may receive the Mura compensation data Dmc of the Mura compensator 132, and may output the image signal DS corresponding to the Mura compensation data Dmc. The image signal DS of the image signal output unit 140 may be regarded as being applied with the compensation of a voltage drop by the voltage drop compensator 122 and the compensation of Mura by the Mura compensator 132.

Accordingly, the panel driver 100 of FIG. 7 according to the present disclosure may prevent a change in luminance due to a voltage drop or a screen defect due to Mura. When Mura compensation is not necessary, the manufacturer may configure the panel driver 100 to provide the voltage drop compensation data Dirc of the voltage drop compensator 122 to the image signal output unit 140. In this case, the image signal output unit 140 may receive the voltage drop compensation data Dirc, and may output the image signal DS corresponding to the voltage drop compensation data Dirc.

In the aspect, the voltage drop compensation value storage 121 may store voltage drop compensation values Virc corresponding to a plurality of preset DBVs and a plurality of preset grayscales, and the Mura compensation value storage 131 may also store Mura compensation values Vmc corresponding to the plurality of preset DBVs and the plurality of preset grayscales.

Therefore, when the image data Din corresponds to a plurality of preset DBVs or a plurality of preset grayscales, the voltage drop compensator 122 may perform the compensation of the image data Din using the voltage drop compensation values Virc stored in the voltage drop compensation value storage 121.

However, when the image data Din corresponds to a DBV and a grayscale between a plurality of DBVs and between a plurality of grayscales applied to the voltage drop compensation values Virc of the voltage drop compensation value storage 121, the voltage drop compensator 122 may generate the voltage drop compensation value Virc for compensating the image data Din, by interpolation using the voltage drop compensation values Virc of the voltage drop compensation value storage 121, and may perform the compensation of the image data Din using the voltage drop compensation value Virc generated by the above interpolation.

Figure 8:
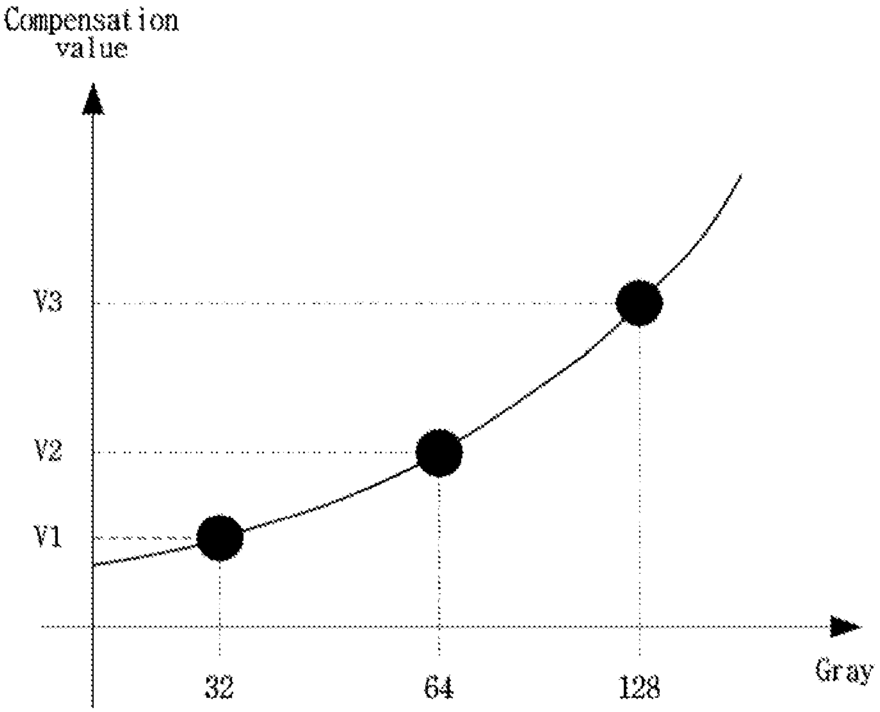
FIG. 8 is a graph for explaining interpolation using a quadratic equation.
Figure 9:
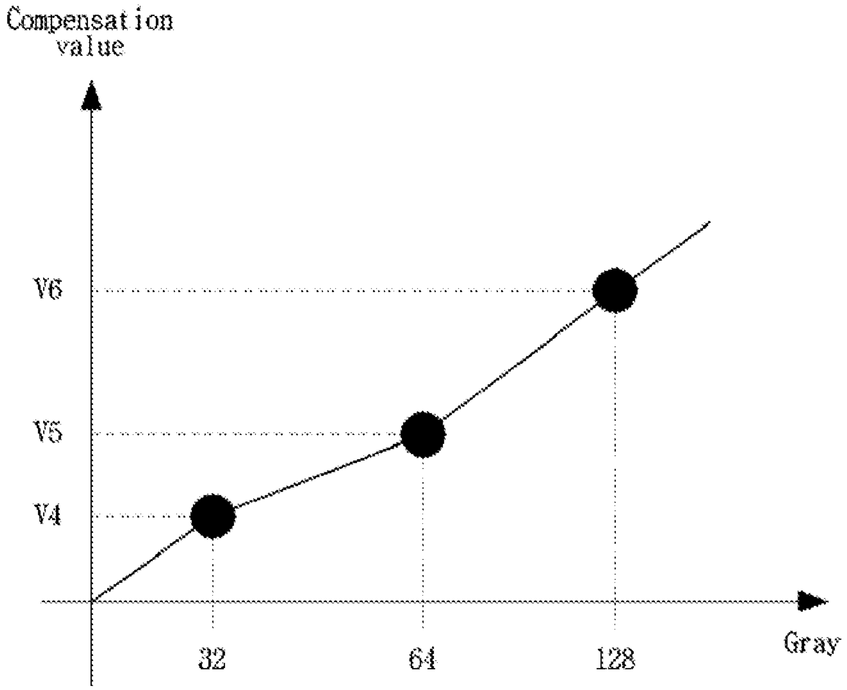
FIG. 9 is a graph for explaining piecewise interpolation.

The above-described interpolation may use a quadratic approximation equation as shown in FIG. 8 or may use piecewise interpolation as shown in FIG. 9. In FIGS. 8 and 9, voltage drop compensation values are indicated as compensation values.

Referring to FIG. 8, the voltage drop compensator 122 may set a quadratic approximation equation that satisfies voltage drop compensation values for grayscales provided from the voltage drop compensation value storage 121, and may calculate a compensation value corresponding to the grayscale of the image data Din by using the quadratic approximation equation. The compensation value calculated by the method of FIG. 8 may be used as the voltage drop compensation value Virc. In the case of FIG. 8, it may be understood that the voltage drop compensation values Virc corresponding to 32 grayscale, 64 grayscale and 128 grayscale of a preset DBV are provided from the voltage drop compensation value storage 121.

The voltage drop compensator 122 may calculate the voltage drop compensation value Virc of a different value by interpolation using the quadratic approximation equation for each DBV.

Referring to FIG. 9, the voltage drop compensator 122 may set a period with voltage drop compensation values Virc for respective grayscales provided from the voltage drop compensation value storage 121, may establish a linear equation that expresses a change in compensation value for each period between grayscales at which the voltage drop compensation values Virc are stored, and may calculate a compensation value corresponding to the grayscale of the image data Din by piecewise interpolation using the linear equation for each period. The compensation value calculated by the method of FIG. 9 may be used as the voltage drop compensation value Virc. Even in the case of FIG. 9, it may be understood that the voltage drop compensation values Virc corresponding to 32 grayscale, 64 grayscale and 128 grayscale of a preset DBV are provided from the voltage drop compensation value storage 121.

The voltage drop compensator 122 may calculate the voltage drop compensation value Virc of a different value by the piecewise interpolation for each DBV.

The voltage drop compensation of the panel driver 100 configured according to the aspect of the present disclosure may be explained with reference to FIGS. 10 and 11.

Figure 10:
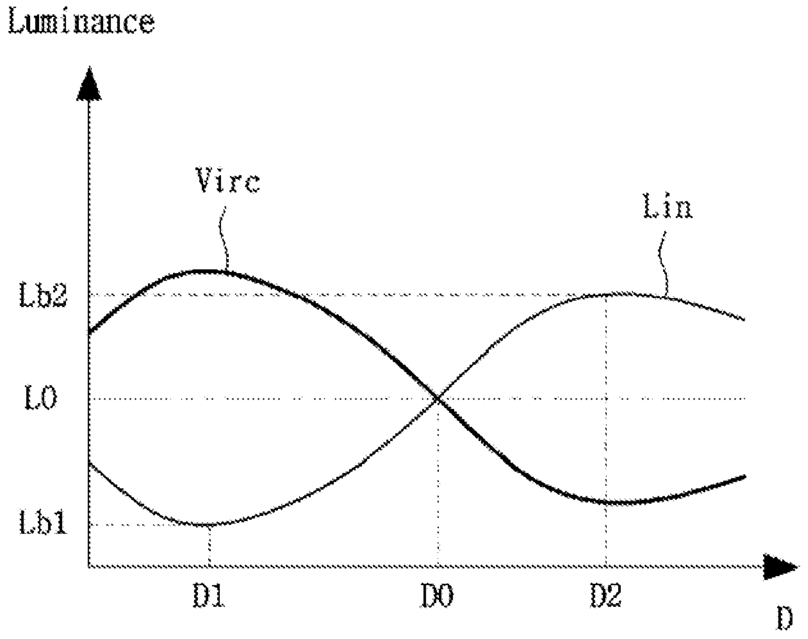
FIG. 10 is a graph showing a detected luminance value and a voltage drop compensation value corresponding to image data.

For example, when image data Din of the same DBV and the same grayscale are applied to all blocks on the y-axis line DY of FIG. 4, as shown in FIG. 10, a change in luminance value corresponding to the image data Din may be expressed as a curve Lin by a voltage drop. Since the shape of the curve Lin of FIG. 10 may be understood with reference to FIG. 5, detailed description thereof will be omitted.

The voltage drop compensator 122 may receive the voltage drop compensation value Virc of the image data Din for each block from the voltage drop compensation value storage 121, and may generate the voltage drop compensation value Virc corresponding to the grayscale of the image data Din of FIG. 10. When luminance changes by a voltage drop for the position of each block BL as in the curve Lin, the voltage drop compensator 122 may generate the voltage drop compensation value Virc like a curve Virc. Since the curve Virc of FIG. 10 may be understood with reference to FIG. 6, detailed description thereof will be omitted.

Figure 11:
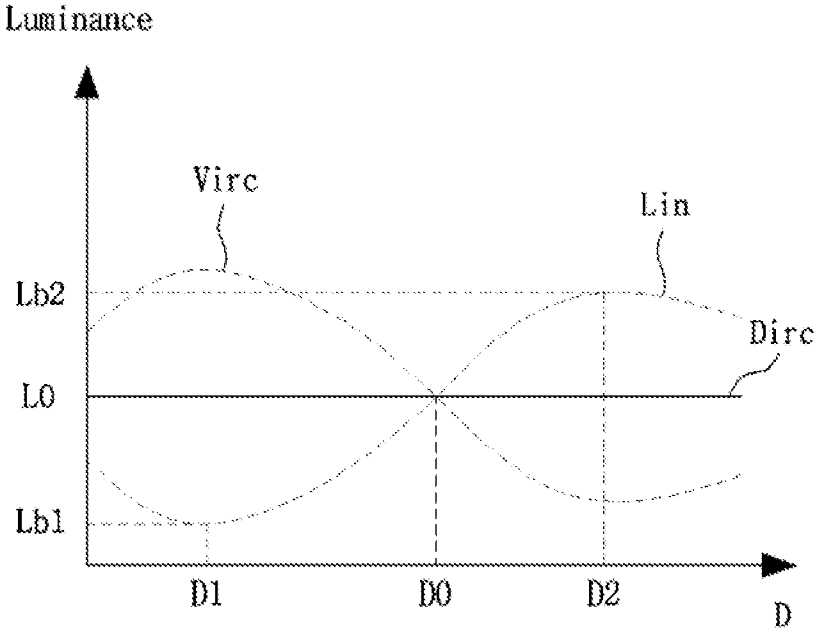
FIG. 11 is a graph showing a luminance compensated using voltage drop compensation data.

The voltage drop compensator 122 may compensate for a luminance change by a voltage drop of the image data Din using the voltage drop compensation value Virc, and as a result, in correspondence to the image data Din of the same DBV and the same grayscale, the luminance values of the blocks BL of the panel 20 may be uniform regardless of positions as shown in FIG. 11.

The voltage drop compensation and Mura compensation of the panel driver 100 configured according to the aspect of the present disclosure may be explained with reference to FIGS. 12 to 14.

Figure 12:
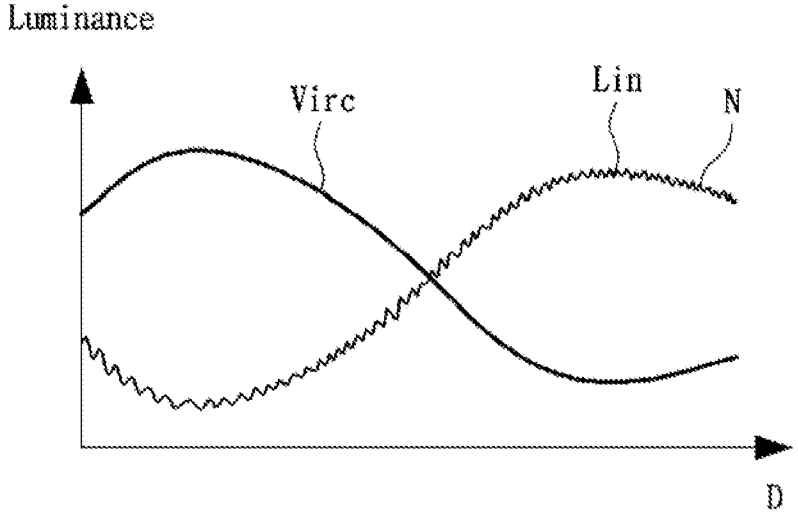
FIG. 12 is a graph showing a detected luminance value and a voltage drop compensation value corresponding to image data when there is Mura.

When a voltage drop and Mura exert influences on the luminance of the blocks BL of the panel 20, the luminance values of the blocks BL corresponding to the image data Din may be expressed like a curve Lin of FIG. 12. It may be understood that the curve Lin of FIG. 12 indicates that noise N by Mura is included in a luminance change of FIG. 10 by a voltage drop.

When a voltage drop and Mura exert influences on the luminance of the blocks BL of the panel 20 as described above, the panel driver 100 may perform voltage drop compensation and then perform Mura compensation.

To compensate for a luminance change as in the curve Lin by a voltage drop acting on the blocks BL, the voltage drop compensator 122 may generate the voltage drop compensation value Virc corresponding to the grayscale of the image data Din. Since the generation of the voltage drop compensation value Virc may be understood with reference to FIG. 10, detailed description thereof will be omitted.

Figure 13:
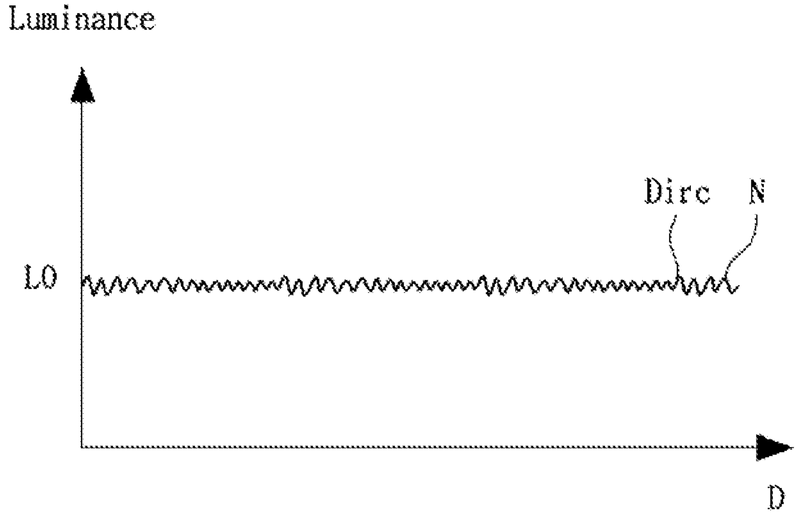
FIG. 13 is a graph showing a luminance by voltage drop compensation data when there is Mura.

The voltage drop compensator 122 may output the voltage drop compensation data Dirc as shown in FIG. 13 by compensating the image data Din with the voltage drop compensation value Virc. At this time, the voltage drop compensation data Dirc includes noise N By Mura because the Mura is not corrected. Since the voltage drop compensation by the voltage drop compensator 122 may be understood with reference to FIGS. 10 and 11, detailed description thereof will be omitted.

The voltage drop compensation data Dirc of the voltage drop compensator 122 is provided to the Mura compensator 132, and the Mura compensator 132 may remove the noise N by the Mura.

In more detail, the Mura compensation value storage 131 stores the Mura compensation value Vmc determined for each block or each pixel, and the Mura compensator 132 may remove the noise N by the Mura included in the voltage drop compensation data Dirc of FIG. 13 using the Mura compensation value Vmc for each block or each pixel of the Mura compensation value storage 131. The Mura compensator 132 may generate the Mura compensation data Dmc by applying the Mura compensation value Vmc to a coefficient of a preset Mura compensation equation.

Figure 14:
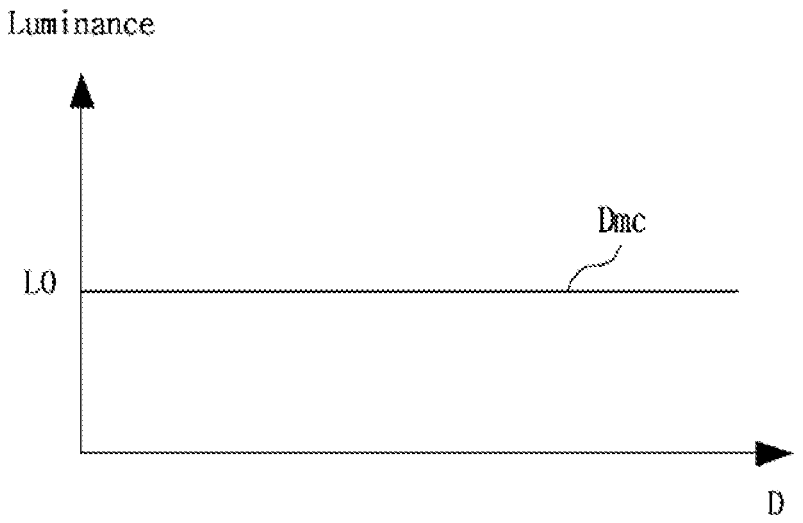
FIG. 14 is a graph showing a luminance corresponding to Mura-compensated data in which Mura is compensated.

As a result, the Mura compensator 132 may generate and output the Mura compensation data Dmc of FIG. 14 from which the noise N by the Mura is removed.

Figure 15:
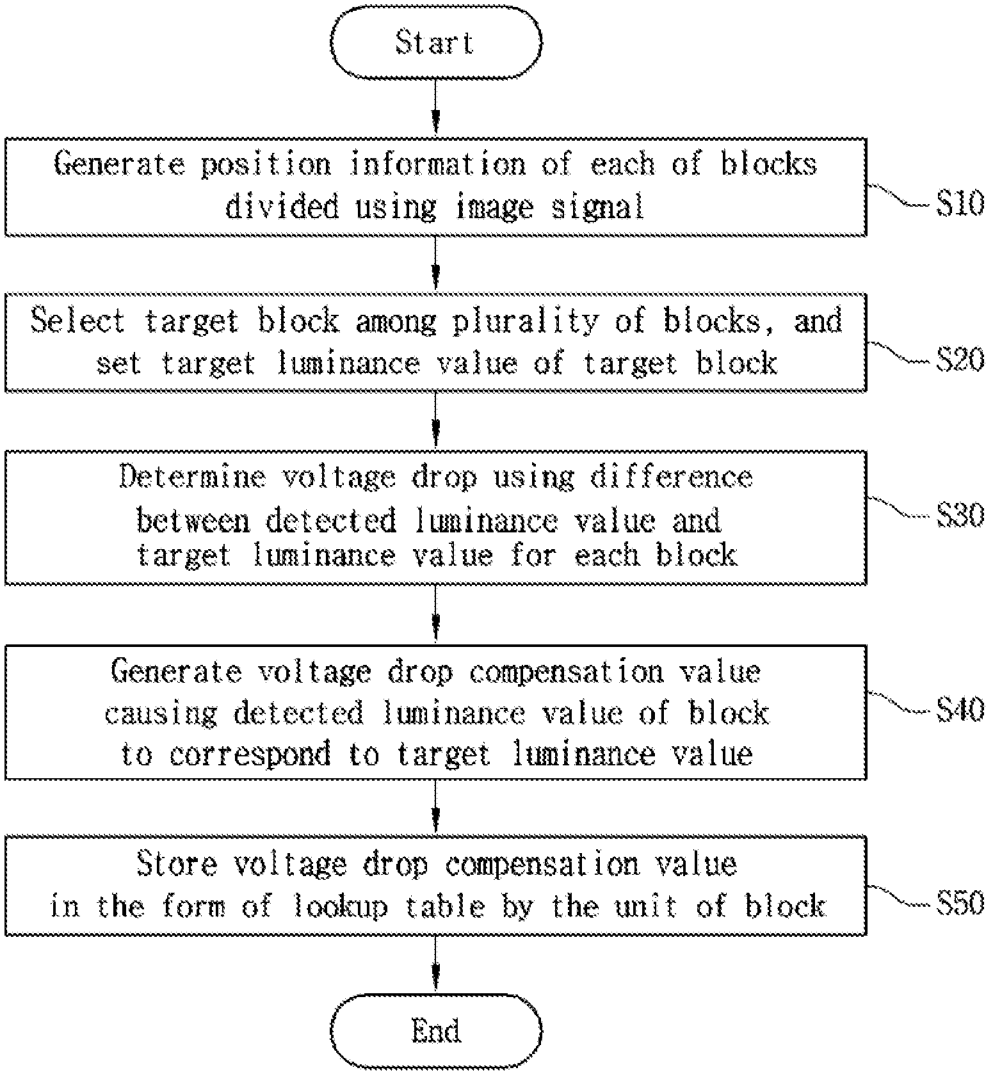
FIG. 15 is a flowchart showing a voltage drop compensation method in accordance with an aspect of the present disclosure.

Hereinafter, a voltage drop compensation method implemented by the present disclosure will be described in detail with reference to FIG. 15. An aspect of the voltage drop compensation method of FIG. 15 may be understood with reference to FIG. 2.

At step S10, the image receiver 410 may divide the image of the panel 20 into a preset number of blocks BL using the image signal Si, and may generate position information of each of the divided blocks BL.

A detected luminance value corresponding to the image signal Si of each of the divided blocks BL may be generated by the luminance value generator 420 and may be transferred to the compensation value generator 430. The position information of the block BL may be transferred together with the detected luminance value.

At step S20, the compensation value generator 430 may select an arbitrary block among the plurality of blocks BL as a target block, and may set the detected luminance value of the target block as a target luminance value. For example, the compensation value generator 430 may select the target block b42 among the plurality of blocks BL, and may set the detected luminance value of the target block b42 as a target luminance value.

At step S30, the compensation value generator 430 may compare the target luminance value of the target block and the detected luminance values of the remaining blocks of the panel 20, and may determine the occurrence of a voltage drop by the unit of block BL using the difference between the target luminance value and the detected luminance value. When the detected luminance value is different from the target luminance value, the compensation value generator 430 may determine that a voltage drop corresponding to the difference between the detected luminance value and the target luminance value has occurred in the block BL.

At step S40, the compensation value generator 430 may generate a plurality of voltage drop compensation values Virc such that the detected luminance values of the blocks BL become the target luminance value L0.

At step S50, the compensation value storage 440 may store the voltage drop compensation value Virc in the form of a lookup table by the unit of block BL.

As is apparent from the above description, according to the aspects of the present disclosure, it is possible to compensate for a voltage drop that may occur differently according to a position of a pixel of a panel, and as a result, it is possible to secure the uniformity of luminance displayed on a screen.

Also, according to the aspects of the present disclosure, it is possible to compensate for Mura or a voltage drop of a panel, and as a result, it is possible to improve the luminance of pixels and display a screen with uniform luminance.

It will be apparent to those skilled in the art that various modifications and variations can be made in the voltage drop compensation system and the display driving device for compensating for the voltage drop of the display panel of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display apparatus comprising:

a data receiver receiving and restoring an image data and outputting the image data;

a voltage drop compensator receiving the image data and a voltage drop compensation value and generating a voltage drop compensation data by applying the voltage drop compensation value to the image data corresponding to a plurality of blocks, each block comprising a plurality of pixels;

a Mura compensator receiving the voltage drop compensation data and generating a Mura compensation value for each block with the voltage drop compensated image data; and an image signal output unit receiving to a Mura compensation value and outputting a Mura compensated image data in accordance with the Mura compensation data to the plurality of blocks to maintain uniform luminance in the plurality of blocks.

2. The display apparatus according to claim 1, wherein the voltage drop compensator detects a luminance value of the plurality of blocks and identifies a voltage drop occurring block among the plurality of blocks to generate the voltage drop compensation data.

3. The display apparatus according to claim 1, further comprising a voltage drop compensation value storage stores the voltage drop compensation value for each of the plurality of blocks.

4. The display apparatus according to claim 3, wherein the voltage drop compensation value storage includes a compensation device that detects a detected luminance value and calculate an average value of luminance values of the plurality of blocks.

5. The display apparatus according to claim 4, wherein the compensation device further calculates a value that changes the detected luminance value to compensate for a voltage drop of the plurality of blocks.

6. The display apparatus according to claim 3, wherein the voltage drop compensator calculates the voltage drop compensation value for grayscales provided from the voltage drop compensation value storage and calculates a compensation value corresponding to the grayscale of the image data by using a quadratic approximation equation.

7. The display apparatus according to claim 1, further comprising a Mura compensation value storage storing the Mura compensation value for each of the plurality of blocks.

8. The display apparatus according to claim 1, wherein the Mura compensation value includes a position information for each block to calculate a coefficient value by using a Mura compensation equation.

9. The display apparatus according to claim 1, wherein the voltage drop compensator generates the voltage drop compensation data by comparing a detected luminance value of a pixel or a block with a preset luminance value stored in the voltage drop compensation value storage, and wherein the preset luminance value is in a form of a lookup table for a driving voltage information of the pixel or the block.

10. The display apparatus according to claim 1, wherein the voltage drop compensation value is to compensate for a driving voltage to the plurality of pixels of a block in which a voltage drop has occurred.

11. The display apparatus according to claim 1, wherein the voltage drop compensator detects a voltage drop region based on a distance information between each of the pixels and a panel driver, and wherein the detected voltage drop region is a square type or a rectangular type.

12. The display apparatus according to claim 1, wherein the display apparatus is an LCD panel or an OLED panel used in a mobile device.

13. The display apparatus according to claim 1, wherein the voltage drop compensator calculates the voltage drop compensation value by using a piecewise interpolation to each a display brightness value.

14. A method of compensating for a voltage drop in a display apparatus, the method comprising:

receiving/restoring an image data and outputting the restored image data;

generating a voltage drop compensation data by applying a voltage drop compensation value to the image data corresponding to a plurality of blocks, each block comprising a plurality of pixels;

generating a Mura compensation value for each block with the voltage drop compensated image data; and outputting a Mura compensated image data in accordance with the Mura compensation data to the plurality of blocks to maintain uniform luminance in the plurality of blocks.

15. The method according to claim 14, wherein the generating the voltage drop compensation data includes detecting a luminance value of the plurality of blocks and identifying a voltage drop occurring block among the plurality of blocks.

16. The display apparatus according to claim 14, wherein the Mura compensation value includes a position information for each block to calculate a coefficient value by using a Mura compensation equation.

17. The display apparatus according to claim 14, wherein the generating the voltage drop compensation data includes comparing a detected luminance value of a pixel or a block with a preset luminance value stored in the voltage drop compensation value storage, and wherein the preset luminance value is in a form of a lookup table for a driving voltage information of the pixel or the block.

18. The display apparatus according to claim 14, wherein the voltage drop compensation value is to compensate for a driving voltage to the plurality of pixels of a block in which a voltage drop has occurred.

19. The display apparatus according to claim 14, wherein the generating the voltage drop compensation data detecting a voltage drop region based on a distance information between each of the pixels and a panel driver, and wherein the detected voltage drop region is a square type or a rectangular type.

20. The display apparatus according to claim 14, wherein the generating the voltage drop compensation data includes calculating the voltage drop compensation value for grayscales and calculating a compensation value corresponding to the grayscale of the image data by using a quadratic approximation equation.

21. The display apparatus according to claim 14, wherein the generating the voltage drop compensation data includes calculating the voltage drop compensation value by using a piecewise interpolation to each a display brightness value.

* * * * *